(12) United States Patent
Ramaswamy

(10) Patent No.: US 8,151,291 B2
(45) Date of Patent: Apr. 3, 2012

(54) METHODS AND APPARATUS TO METER CONTENT EXPOSURE USING CLOSED CAPTION INFORMATION

(75) Inventor: Arun Ramaswamy, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 466 days.

(21) Appl. No.: 11/761,033

(22) Filed: Jun. 11, 2007

(65) Prior Publication Data

US 2007/0294729 A1 Dec. 20, 2007

Related U.S. Application Data

(60) Provisional application No. 60/804,893, filed on Jun. 15, 2006.

(51) Int. Cl.
H04N 60/33 (2006.01)
H04N 9/00 (2006.01)
H04N 7/16 (2011.01)

(52) U.S. Cl. .................. 725/9; 725/14; 725/20

(58) Field of Classification Search ............... 725/9, 14, 725/20, 46
See application file for complete search history.

(56) References Cited

U.S. PATENT DOCUMENTS

| | | |
|---|---|---|
| 3,372,233 A | 3/1968 | Currey |
| 3,845,391 A | 10/1974 | Crosby |
| 3,919,479 A | 11/1975 | Moon et al. |
| 4,025,851 A | 5/1977 | Haselwood et al. |
| 4,027,332 A | 5/1977 | Wu et al. |
| 4,230,990 A | 10/1980 | Lert, Jr. et al. |
| 4,547,804 A | 10/1985 | Greenberg |
| 4,574,304 A | 3/1986 | Watanabe et al. |
| 4,599,644 A | 7/1986 | Fischer |
| 4,622,583 A | 11/1986 | Watanabe et al. |
| 4,633,302 A | 12/1986 | Damoci |
| 4,639,779 A | 1/1987 | Greenberg |
| 4,647,974 A | 3/1987 | Butler et al. |
| 4,677,466 A | 6/1987 | Lert, Jr. et al. |
| 4,697,209 A | 9/1987 | Kiewit et al. |
| 4,718,106 A | 1/1988 | Weinblatt |

(Continued)

FOREIGN PATENT DOCUMENTS

CA 2293957 7/2000

(Continued)

OTHER PUBLICATIONS

International Bureau, International Preliminary Report on Patentability for International application No. PCT/US2007/070878, Dec. 16, 2008, 6 pages.

(Continued)

*Primary Examiner* — Pankaj Kumar
*Assistant Examiner* — Mulugeta Mengesha
(74) *Attorney, Agent, or Firm* — Hanley, Flight & Zimmerman, LLC

(57) ABSTRACT

Methods and apparatus to meter content exposure using closed caption information are disclosed. An example method comprises developing a keyword database of terms based on program guide descriptive of programs for a given time period, generating one or more values representative of likelihoods that one or more respective media content was presented based on a comparison of closed caption text and the keyword database, collecting audience measurement data, and employing the one or more likelihood values to identify a set of reference data for comparison to the audience measurement data to identify presented content.

22 Claims, 7 Drawing Sheets

U.S. PATENT DOCUMENTS

| | | | |
|---|---|---|---|
| 4,739,398 A | 4/1988 | Thomas et al. | |
| 4,750,034 A | 6/1988 | Lem | |
| 4,764,808 A | 8/1988 | Solar | |
| 4,792,864 A | 12/1988 | Watanabe et al. | |
| 4,816,904 A | 3/1989 | McKenna et al. | |
| 4,839,919 A | 6/1989 | Borges et al. | |
| 4,843,562 A | 6/1989 | Kenyon et al. | |
| 4,847,685 A | 7/1989 | Gall et al. | |
| 4,857,999 A | 8/1989 | Welsh | |
| 4,858,000 A | 8/1989 | Lu | |
| 4,876,617 A | 10/1989 | Best et al. | |
| 4,931,871 A | 6/1990 | Kramer | |
| 4,945,412 A | 7/1990 | Kramer | |
| 4,955,070 A | 9/1990 | Welsh et al. | |
| 4,965,825 A | 10/1990 | Harvey et al. | |
| 4,972,503 A | 11/1990 | Zurlinden | |
| 5,019,899 A | 5/1991 | Boles et al. | |
| 5,020,142 A | 5/1991 | Shirasaka | |
| 5,023,929 A | 6/1991 | Call | |
| 5,113,437 A | 5/1992 | Best et al. | |
| 5,138,659 A | 8/1992 | Kelkar et al. | |
| 5,155,762 A | 10/1992 | Croquet et al. | |
| 5,165,069 A | 11/1992 | Vitt et al. | |
| 5,200,822 A | 4/1993 | Bronfin et al. | |
| 5,251,324 A | 10/1993 | McMullan, Jr. | |
| 5,278,988 A | 1/1994 | Dejean et al. | |
| 5,294,977 A | 3/1994 | Fisher et al. | |
| 5,319,453 A | 6/1994 | Copriviza et al. | |
| 5,369,440 A | 11/1994 | Sussman | |
| 5,373,315 A | 12/1994 | Dufresne et al. | |
| 5,379,345 A | 1/1995 | Greenberg | |
| 5,404,161 A | 4/1995 | Douglass et al. | |
| 5,404,377 A | 4/1995 | Moses | |
| 5,425,100 A | 6/1995 | Thomas et al. | |
| 5,436,653 A | 7/1995 | Ellis et al. | |
| 5,437,050 A | 7/1995 | Lamb et al. | |
| 5,450,122 A | 9/1995 | Keene | |
| 5,450,490 A | 9/1995 | Jensen et al. | |
| 5,481,294 A * | 1/1996 | Thomas et al. | 725/20 |
| 5,481,296 A | 1/1996 | Cragun et al. | |
| 5,485,518 A | 1/1996 | Hunter et al. | |
| 5,488,408 A | 1/1996 | Maduzia et al. | |
| 5,490,060 A | 2/1996 | Malec et al. | |
| 5,495,282 A | 2/1996 | Mostafa et al. | |
| 5,497,185 A | 3/1996 | Dufresne et al. | |
| 5,504,518 A | 4/1996 | Ellis et al. | |
| 5,512,933 A | 4/1996 | Wheatley et al. | |
| 5,526,427 A | 6/1996 | Thomas et al. | |
| 5,532,732 A | 7/1996 | Yuen et al. | |
| 5,559,549 A | 9/1996 | Hendricks et al. | |
| 5,572,246 A | 11/1996 | Ellis et al. | |
| 5,574,962 A | 11/1996 | Fardeau et al. | |
| 5,581,800 A | 12/1996 | Fardeau et al. | |
| 5,583,784 A | 12/1996 | Kapust et al. | |
| 5,594,934 A | 1/1997 | Lu et al. | |
| 5,600,364 A | 2/1997 | Hendricks et al. | |
| 5,608,445 A | 3/1997 | Mischler | |
| 5,612,729 A * | 3/1997 | Ellis et al. | 725/22 |
| 5,621,454 A | 4/1997 | Ellis et al. | |
| 5,629,739 A | 5/1997 | Dougherty | |
| 5,646,675 A | 7/1997 | Copriviza et al. | |
| 5,654,748 A | 8/1997 | Matthews, III | |
| 5,659,350 A | 8/1997 | Hendricks et al. | |
| 5,675,510 A | 10/1997 | Coffey et al. | |
| 5,676,282 A | 10/1997 | Satterfield | |
| 5,701,582 A | 12/1997 | DeBey | |
| 5,703,655 A | 12/1997 | Corey et al. | |
| 5,726,701 A | 3/1998 | Needham | |
| 5,734,444 A | 3/1998 | Yoshinobu | |
| 5,737,025 A | 4/1998 | Dougherty et al. | |
| 5,757,414 A | 5/1998 | Thorne | |
| 5,764,763 A | 6/1998 | Jensen et al. | |
| 5,768,680 A | 6/1998 | Thomas | |
| 5,771,307 A | 6/1998 | Lu et al. | |
| 5,774,664 A | 6/1998 | Hidary et al. | |
| 5,790,977 A | 8/1998 | Ezekiel | |
| 5,793,414 A | 8/1998 | Shaffer | |
| 5,796,952 A | 8/1998 | Davis et al. | |
| 5,798,785 A | 8/1998 | Hendricks et al. | |
| 5,801,782 A | 9/1998 | Patterson | |
| 5,809,471 A | 9/1998 | Brodsky | |
| 5,819,156 A | 10/1998 | Belmont | |
| 5,842,010 A | 11/1998 | Jain et al. | |
| 5,848,396 A | 12/1998 | Gerace | |
| 5,857,190 A | 1/1999 | Brown | |
| 5,870,754 A | 2/1999 | Dimitrova et al. | |
| 5,872,588 A | 2/1999 | Aras et al. | |
| 5,880,789 A | 3/1999 | Inaba | |
| 5,881,360 A | 3/1999 | Fong | |
| 5,884,301 A | 3/1999 | Takano | |
| 5,889,548 A | 3/1999 | Chan | |
| 5,914,746 A | 6/1999 | Matthews, III et al. | |
| 5,926,207 A | 7/1999 | Vaughan et al. | |
| 5,929,849 A | 7/1999 | Kikinis | |
| 5,963,914 A | 10/1999 | Skinner et al. | |
| 5,973,750 A | 10/1999 | Ogawa et al. | |
| 5,974,299 A | 10/1999 | Massetti | |
| 6,025,837 A | 2/2000 | Matthews, III et al. | |
| 6,035,177 A | 3/2000 | Moses et al. | |
| 6,058,430 A | 5/2000 | Kaplan | |
| 6,061,056 A | 5/2000 | Menard et al. | |
| 6,061,719 A | 5/2000 | Bendinelli et al. | |
| 6,085,066 A | 7/2000 | Fong | |
| 6,097,383 A | 8/2000 | Gaughan et al. | |
| 6,112,053 A | 8/2000 | Dunki-Jacobs et al. | |
| 6,115,680 A | 9/2000 | Coffee et al. | |
| 6,124,877 A | 9/2000 | Schmidt | |
| 6,130,726 A | 10/2000 | Darbee et al. | |
| 6,160,570 A | 12/2000 | Sitnik | |
| 6,163,316 A | 12/2000 | Killian | |
| 6,167,436 A | 12/2000 | Yamane et al. | |
| 6,184,918 B1 | 2/2001 | Goldschmidt Iki et al. | |
| 6,198,511 B1 | 3/2001 | Matz et al. | |
| 6,199,206 B1 | 3/2001 | Nishioka et al. | |
| 6,202,210 B1 | 3/2001 | Ludtke | |
| 6,215,483 B1 | 4/2001 | Zigmond | |
| 6,219,042 B1 | 4/2001 | Anderson et al. | |
| 6,229,532 B1 | 5/2001 | Fujii | |
| 6,240,555 B1 | 5/2001 | Shoff et al. | |
| 6,263,505 B1 | 7/2001 | Walker et al. | |
| 6,266,094 B1 | 7/2001 | Taylor, Jr. | |
| 6,286,140 B1 | 9/2001 | Ivanyi | |
| 6,317,885 B1 | 11/2001 | Fries | |
| 6,326,982 B1 | 12/2001 | Wu et al. | |
| 6,349,410 B1 | 2/2002 | Lortz | |
| 6,374,404 B1 | 4/2002 | Brotz et al. | |
| 6,381,748 B1 | 4/2002 | Lin et al. | |
| 6,418,169 B1 | 7/2002 | Datari | |
| 6,421,445 B1 | 7/2002 | Jensen et al. | |
| 6,442,755 B1 | 8/2002 | Lemmons et al. | |
| 6,473,903 B2 | 10/2002 | Balakrishnan et al. | |
| 6,510,152 B1 | 1/2003 | Gerszberg et al. | |
| 6,510,462 B2 | 1/2003 | Blumenau | |
| 6,513,161 B2 | 1/2003 | Wheeler et al. | |
| 6,564,383 B1 | 5/2003 | Combs et al. | |
| 6,647,548 B1 | 11/2003 | Lu et al. | |
| 6,675,383 B1 | 1/2004 | Wheeler et al. | |
| 6,735,775 B1 | 5/2004 | Massetti | |
| 6,925,650 B1 * | 8/2005 | Arsenault et al. | 725/39 |
| 6,973,256 B1 * | 12/2005 | Dagtas | 386/46 |
| 6,973,665 B2 * | 12/2005 | Dudkiewicz et al. | 725/46 |
| 7,150,030 B1 | 12/2006 | Eldering et al. | |
| 7,222,071 B2 * | 5/2007 | Neuhauser et al. | 704/231 |
| 7,316,025 B1 * | 1/2008 | Aijala et al. | 725/18 |
| 7,421,723 B2 | 9/2008 | Harkness et al. | |
| 7,440,950 B2 * | 10/2008 | Horvitz et al. | 1/1 |
| 7,454,776 B1 | 11/2008 | Walker et al. | |
| 7,483,975 B2 * | 1/2009 | Kolessar et al. | 709/224 |
| 2002/0010919 A1 * | 1/2002 | Lu et al. | 725/18 |
| 2002/0035573 A1 | 3/2002 | Black et al. | |
| 2002/0059577 A1 * | 5/2002 | Lu et al. | 725/9 |
| 2002/0059633 A1 | 5/2002 | Harkness et al. | |
| 2002/0157096 A1 | 10/2002 | Hane et al. | |
| 2002/0188945 A1 | 12/2002 | McGee et al. | |
| 2003/0037333 A1 * | 2/2003 | Ghashghai et al. | 725/46 |
| 2003/0051234 A1 | 3/2003 | Schmidt | |
| 2003/0093789 A1 * | 5/2003 | Zimmerman et al. | 725/34 |

| | | | |
|---|---|---|---|
| 2003/0185541 | A1 | 10/2003 | Green |
| 2004/0088721 | A1 | 5/2004 | Wheeler et al. |
| 2004/0122679 | A1 | 6/2004 | Neuhauser et al. |
| 2005/0054285 | A1* | 3/2005 | Mears et al. ............... 455/2.01 |
| 2005/0144632 | A1* | 6/2005 | Mears et al. ................... 725/15 |
| 2005/0210530 | A1* | 9/2005 | Horvitz et al. ............... 725/134 |
| 2005/0216509 | A1* | 9/2005 | Kolessar et al. ........... 707/104.1 |
| 2005/0273840 | A1 | 12/2005 | Mitts et al. |
| 2006/0195857 | A1* | 8/2006 | Wheeler et al. ................ 725/15 |
| 2007/0186229 | A1* | 8/2007 | Conklin et al. ................ 725/14 |
| 2007/0192782 | A1* | 8/2007 | Ramaswamy ................... 725/9 |
| 2008/0267584 | A1 | 10/2008 | Green |

FOREIGN PATENT DOCUMENTS

| | | |
|---|---|---|
| CA | 2460178 | 3/2003 |
| CN | 1404609 A | 3/2003 |
| CN | 1262003 A | 6/2006 |
| EP | 0195639 | 9/1986 |
| EP | 0245037 | 11/1987 |
| EP | 0598398 | 5/1994 |
| EP | 0687083 | 12/1995 |
| EP | 0985287 | 3/2000 |
| EP | 1428387 | 6/2004 |
| FR | 2555383 | 5/1985 |
| FR | 2717025 | 9/1995 |
| GB | 2170080(A) | 7/1986 |
| WO | 9111062 | 7/1991 |
| WO | 9411989 | 5/1994 |
| WO | 9515653 | 6/1995 |
| WO | 9641495 | 12/1996 |
| WO | 9831155 | 7/1998 |
| WO | 9959275 | 11/1999 |
| WO | 9962260 | 12/1999 |
| WO | 00/02385 | 1/2000 |
| WO | 0004662 | 1/2000 |
| WO | 0016552 | 3/2000 |
| WO | 02/37498 | 5/2002 |
| WO | 03026169 | 3/2003 |

OTHER PUBLICATIONS

International Search Report for international patent application serial No. PCT/US2007/070878, mailed Jan. 22, 2008, 2 pages.
Written Opinion of the International Searching Authority for international patent application serial No. PCT/US2007/070878, mailed Jan. 22, 2008, 6 pages.
Chinese Patent Office, Translation of Office Action pertaining to Chinese Patent Application No. 200780021863.5, issued on Nov. 1, 2010 (6 pages).
Second Chinese Office Action, issued by the State Intellectual Property Office of P.R. China, in connection with Chinese patent application 200780021863.5, on Sep. 26, 2011, 5 pages.
Patent Cooperation Treaty, "International Search Report," issued by the International Searching Authority in connection with PCT application No. PCT/US1998/023558, mailed Aug. 27, 1999 (4 pages).
Patent Cooperation Treaty, "International Search Report," issued by the International Searching Authority in connection with PCT application No. PCT/US2000/003829, mailed Aug. 18, 2000 (3 pages).
Patent Cooperation Treaty, "International Search Report," issued by the International Searching Authority in connection with PCT application No. PCT/US2002/029435, mailed Apr. 3, 2003 (3 pages).
Patent Cooperation Treaty, "Written Opinion," issued by the International Preliminary Examining Authority in connection with PCT application No. PCT/US2002/029435, mailed Nov. 3, 2003 (6 pages).
United States Patent and Trademark Office, "Non-Final Office Action," issued in connection with U.S. Appl. No. 09/076,517, on Mar. 5, 2002 (14 pages).
United States Patent and Trademark Office, "Non-Final Office Action," issued in connection with U.S. Appl. No. 09/076,517, on Nov. 19, 2002 (11 pages).
United States Patent and Trademark Office, "Final Office Action," issued in connection with U.S. Appl. No. 09/076,517, on Aug. 11, 2003 (14 pages).
United States Patent and Trademark Office, "Final Office Action," issued in connection with U.S. Appl. No. 09/076,517, on Mar. 11, 2004 (17 pages).
United States Patent and Trademark Office, "Examiner's Answer in response to the Appeal Brief filed Apr. 13, 2005," issued in connection with U.S. Appl. No. 09/076,517, on Nov. 2, 2005 (14 pages).
United States Patent and Trademark Office, "Decision on Appeal," issued in connection with U.S. Appl. No. 09/076,517, on Sep. 26, 2006 (12 pages).
United States Patent and Trademark Office, "Non-Final Office Action," issued in connection with U.S. Appl. No. 09/949,938, on Oct. 24, 2002 (11 pages).
United States Patent and Trademark Office, "Non-Final Office Action," issued in connection with U.S. Appl. No. 09/949,938, on May 9, 2003 (8 pages).
United States Patent and Trademark Office, "Final Office Action," issued in connection with U.S. Appl. No. 09/949,938, on Nov. 7, 2003 (11 pages).
United States Patent and Trademark Office, "Non-Final Office Action," issued in connection with U.S. Appl. No. 11/339,269, on Feb. 15, 2008 (28 pages).
United States Patent and Trademark Office, "Final Office Action," issued in connection with U.S. Appl. No. 11/339,269, on Nov. 26, 2008 (29 pages).
United States Patent and Trademark Office, "Advisory Action Before the Filing of an Appeal Brief," issued in connection with U.S. Appl. No. 11/339,269, on Feb. 25, 2009 (3 pages).
United States Patent and Trademark Office, "Non-Final Office Action," issued in connection with U.S. Appl. No. 11/595,117, on Nov. 25, 2008 (7 pages).
United States Patent and Trademark Office, "Notice of Abandonment," issued in connection with U.S. Appl. No. 09/226,521, on Apr. 9, 2004 (2 pages).
United States Patent and Trademark Office, "Non-Final Office Action," issued in connection with U.S. Appl. No. 09/226,521, on Sep. 5, 2003 (15 pages).
United States Patent and Trademark Office, "Final Office Action," issued in connection with U.S. Appl. No. 09/226,521, on Nov. 6, 2002 (13 pages).
United States Patent and Trademark Office, "Non-Final Office Action," issued in connection with U.S. Appl. No. 09/226,521, on May 10, 2002 (9 pages).
United States Patent and Trademark Office, "Final Office Action," issued in connection with U.S. Appl. No. 09/955,691, on May 31, 2008 (6 pages).
United States Patent and Trademark Office, "Notice of Allowance," issued in connection with U.S. Appl. No. 09/955,691, on Apr. 30, 2008 (6 pages).
United States Patent and Trademark Office, "Final Office Action," issued in connection with U.S. Appl. No. 09/955,691, on Mar. 4, 2008 (7 pages).
United States Patent and Trademark Office, "Non-Final Office Action," issued in connection with U.S. Appl. No. 09/955,691, on Aug. 20, 2007 (8 pages).
United States Patent and Trademark Office, "Decision on Appeal," issued in connection with U.S. Appl. No. 09/955,691, on Feb. 28, 2007 (11 pages).
United States Patent and Trademark Office, "Non-Final Office Action," issued in connection with U.S. Appl. No. 09/955,691, on Aug. 11, 2005 (11 pages).
United States Patent and Trademark Office, "Final Office Action," issued in connection with U.S. Appl. No. 09/955,691, on Apr. 7, 2004 (9 pages).
United States Patent and Trademark Office, "Non-Final Office Action," issued in connection with U.S. Appl. No. 09/955,691, on Aug. 1, 2003 (12 pages).
Australian Intellectual Property Office, "Notice of Acceptance," issued in connection with Australian Patent Application Serial No. 57828/01, on Dec. 3, 2002 (2 pages).
Australian Intellectual Property Office, "Notice of Acceptance," issued in connection with Australian Patent Application Serial No. 57833/01, on Dec. 3, 2002 (2 pages).
Australian Intellectual Property Office, "Examiner's First Report," issued in connection with Australian Patent Application Serial No. 82980/98, on Jul. 24, 2000 (2 pages).

"The Claims Defining the Invention," which were allowed in connection with Australian Patent Application Serial No. 57830/01, Dec. 3, 2002 (4 pages).

Australian Intellectual Property Office, "Notice of Acceptance," issued in connection with Australian Patent Application Serial No. 57830/01, on Dec. 3, 2002 (2 pages).

"The Claims Defining the Invention," which were allowed in connection with Australian Patent Application Serial No. 57831/01, Sep. 9, 2003 (1 page).

Australian Intellectual Property Office, "Notice of Acceptance," issued in connection with Australian Patent Application Serial No. 57831/01, on Sep. 9, 2003 (2 pages).

Australian Intellectual Property Office, "Notice of Acceptance," issued in connection with Australian Patent Application Serial No. 57832/01, on Oct. 27, 2003 (2 pages).

"The Claims Defining the Invention," which were allowed in connection with Australian Patent Application Serial No. 57832/01, Oct. 27, 2003 (2 pages).

Canadian Intellectual Property Office, "Notification of a Requisition by the Examiner," issued in connection with Canadian Patent Application Serial No. 2,289,519, on Feb. 9, 2000 (3 pages).

Canadian Intellectual Property Office, "Notification of a Requisition by the Examiner," issued in connection with Canadian Patent Application Serial No. 2,289,519, on Jun. 16, 2000 (2 pages).

English Language Translation of the Granted Claims in connection with Chinese Patent Application Serial No. 98806840.0, Oct. 17, 2003 (5 pages).

The State Intellectual Property Office of China, "First Office Action," issued in connection with Chinese Patent Application Serial No. 98806840.0, on Oct. 25, 2002, with its English language translation (11 pages).

The State Intellectual Property Office of China, "Notice of Grant of Patent Right to Invention," issued in connection with Chinese Patent Application Serial No. 98806840.0, on Oct. 17, 2003, with its English language translation (4 pages).

The State Intellectual Property Office of China, "Second Office Action," issued in connection with Chinese Patent Application Serial No. 98806840.0, on Apr. 25, 2003, with its English language translation (7 pages).

The State Intellectual Property Office of China, "First Office Action," issued in connection with Chinese Patent Application Serial No. 200310123387.1, on Dec. 8, 2006, with its English language translation (8 pages).

The State Intellectual Property Office of China, "Second Office Action," issued in connection with Chinese Patent Application Serial No. 200310123387.1, on Aug. 3, 2007, with its English language translation (7 pages).

The State Intellectual Property Office of China, "Rejection Decision," issued in connection with Chinese Patent Application Serial No. 200310123387.1, on Apr. 4, 2008, with its English language translation (7 pages).

European Patent Office, "Communication Pursuant to Article 96(2) and Rule 51(2) EPC," issued in connection with European Patent Application Serial No. 98 933 309.1, on Mar. 15, 2000 (4 pages).

European Patent Office, "Communication Pursuant to Article 96(2) EPC," issued in connection with European Patent Application Serial No. 98 933 309.1, on Sep. 14, 2000 (4 pages).

European Patent Office, "Communication Pursuant to Article 96(2) EPC," issued in connection with European Patent Application Serial No. 98 933 309.1, on Apr. 23, 2001 (5 pages).

European Patent Office, "Communication Pursuant to Article 96(2) EPC," issued in connection with European Patent Application Serial No. 98 933 309.1, on Sep. 13, 2001 (3 pages).

European Patent Office, "Communication Pursuant to Article 96(2) EPC," issued in connection with European Patent Application Serial No. 98 933 309.1, on Jan. 7, 2003 (6 pages).

European Patent Office, "Summons to Attend Oral Proceedings Pursuant to Rule 71(1) EPC," issued in connection with European Patent Application Serial No. 98 933 309.1, on Mar. 12, 2004 (7 pages).

European Patent Office, "Communication Under Rule 51(4) EPC," issued in connection with European Patent Application Serial No. 98 933 309.1, on Nov. 17, 2004 (11 pages).

European Patent Office, "Communication Pursuant to Article 96(2) EPC," issued in connection with European Patent Application Serial No. 00 114 271.0, on Sep. 13, 2001 (4 pages).

European Patent Office, "Communication Pursuant to Article 96(2) EPC," issued in connection with European Patent Application Serial No. 00 114 271.0, on Jan. 7, 2003 (4 pages).

European Patent Office, "Summons to Attend Oral Proceedings Pursuant to Rule 71(1) EPC," issued in connection with European Patent Application Serial No. 00 114 271.0, on Mar. 11, 2004 (6 pages).

European Patent Office, "Provision of the Minutes in Accordance with Rule 76(4) EPC," issued in connection with European Patent Application Serial No. 00 114 271.0, on Nov. 10, 2004 (7 pages).

European Patent Office, "Communication Under Rule 51(4) EPC," issued in connection with European Patent Application Serial No. 00 114 271.0, on Nov. 24, 2004 (4 pages).

European Patent Office, "Annexure of Communication Under Rule 51(4) EPC," issued in connection with European Patent Application Serial No. 00 114 271.0, on Nov. 24, 2004 (6 pages).

European Patent Office, "Decision to Grant a European Patent Pursuant to Article 97(2) EPC," issued in connection with European Patent Application Serial No. 00 114 271.0, on Apr. 21, 2005 (1 page).

European Patent Office, "Communication Pursuant to Article 96(2) EPC," issued in connection with European Patent Application Serial No. 00 114 272.8, on Jul. 3, 2001 (3 pages).

European Patent Office, "Communication Pursuant to Article 96(2) EPC," issued in connection with European Patent Application Serial No. 00 114 272.8, on Nov. 28, 2002 (3 pages).

European Patent Office, "Communication Pursuant to Article 115(2) EPC," issued in connection with European Patent Application Serial No. 00 114 272.8, on Aug. 14, 2003 (16 pages).

European Patent Office, "Communication Pursuant to Article 96(2) EPC," issued in connection with European Patent Application Serial No. 00 114 272.8, on Jun. 28, 2004 (4 pages).

European Patent Office, "Adjournment of Examination/Opposition Proceedings," issued in connection with European Patent Application Serial No. 00 114 272.8, on Apr. 11, 2006 (1 page).

European Patent Office, "Communication Under Rule 51(4) EPC," issued in connection with European Patent Application Serial No. 00 114 272.8, on Mar. 15, 2007 (4 pages).

European Patent Office, "Supplemental European Search Report," issued in connection with European Patent Application Serial No. 02766287.3, on Dec. 10, 2009 (3 pages).

Indian Patent Office, "First Examination Report," issued in connection with Indian Patent Application Serial No. 1812/MAS/98, on Dec. 30, 2004 (3 pages).

Japanese Patent Office, "Office Action (Notice of Grounds of Rejection)," issued in connection with Japanese Patent Application Serial No. 2000-548980, on Apr. 8, 2008, with its English language translation (6 pages).

English Language Translation of the Allowed Claims for Japanese Patent Application Serial No. 2000-548980, dated Mar. 24, 2009 (4 pages).

Japanese Patent Office, "Notice regarding Submission of Prior Art Document by an Anonymous Third Party on May 25, 2007," issued in connection with Japanese Patent Application Serial No. 2000-548980 (3 pages).

English Language Translation of the Notice of Allowance issued by the Japanese Patent Office in connection with Japanese Patent Application Serial No. 2000-548980, on Mar. 10, 2009 (2 pages).

English Language Translation of the First Office Action issued by the Mexican Patent Office, in connection with Mexican Patent Application Serial No. PA/a/2004/008118, dated Jul. 2, 2007 (1 page).

English Language Translation of the Second Office Action issued by the Mexican Patent Office, in connection with Mexican Patent Application Serial No. PA/a/2004/008118, dated Jan. 2, 2008 (1 page).

BBM, "Matching Pictures, Matching Expectations; The BBM PMT Validation Study Executive Summary Report," Vancouver, Canada, Feb. 9, 1998 (10 pages).

Purdye et al., "Matching Pictures, Matching Expectations; The BBM Validation Test of TN-AGB's Picture Matching Technology," conducted in Vancouver, Canada, 1998 (11 pages).

Cook et al., "Metering Television in the Digital Age" (4 pages).

BBM, "The M Files," The Department of Intergalactic Audience Measurement, Canada (2 pages).

SCTE DVS 136, "An Overview of PSIP for Cable," ATSC T3/S8 Doc. 268, issued on Apr. 3, 1998 (5 pages).

Audio Media, "Digital Audio Watermarking," Jan. 1998 (4 pages).

Namba et al., "A Program Identification Code Transmission System Using Low-Frequency Audio Signals," NHK Science and Technical Research Laboratories, Tokyo, Japan, Mar. 1985 (14 pages).

Steele et al., "Simultaneous Transmission of Speech and Data Using Code-Breaking Techniques," pp. 2061-2105, vol. 60, No. 9, The Bell System Technical Journal, American Telephone and Telegraph Company, issued in Nov. 1981 (25 pages).

Fink et al., "Social- and Interactive-Television Applications Based on Real-Time Ambient-Audio Identification," EuroITV, Athens, Greece, May 2006 (10 pages).

Japanese Patent Office, "Certificate of Patent," issued in connection with JP Patent No. 4287053, on Apr. 3, 2009, with English language translation of the claims (4 pages).

Advanced Television Systems Committee, "Guide to the Use of the ATSC Digital Television Standard," Oct. 4, 1995 (148 pages).

Advanced Television Systems Committee, "Program and System Information Protocol for Terrestrial Broadcast and Cable (Revision A) and Amendment No. 1," May 31, 2000 (140 pages).

Advanced Television Systems Committee, "Program/Episode/Version Identification ATSC Standard," Aug. 30, 1996 (16 pages).

Advanced Television Systems Committee, "Draft: Annex G (Informative)—An Overview of PSIP for Cable," Apr. 3, 1998 (5 pages).

Balabanian et al., "An Introduction to Digital Storage Media—Command and Control (DSM-CC)," retrieved via http://mpeg.telecomitalialab.com/documents/dsmcc/dsmcc.htm, on Aug. 20, 2002 (11 pages).

Patent Cooperation Treaty, "International Search Report," issued by the International Searching Authority in connection with PCT application No. PCT/US1998/014286, mailed Jul. 1, 1999 (2 pages).

European Patent Office, "European Search Report," issued in connection with European Patent Application Serial No. 00 114 271.0, Oct. 3, 2000 (2 pages).

European Patent Office, "European Search Report," issued in connection with European Patent Application Serial No. 00 114 272.8, Oct. 5, 2000 (4 pages).

Supplemental European Search Report, issued by the European Patent Office on Dec. 20, 2011, in connection with European Application No. EP07784391, 9 pages.

* cited by examiner

METHODS AND APPARATUS TO METER CONTENT EXPOSURE USING CLOSED CAPTION INFORMATION

RELATED APPLICATIONS

This patent claims the benefit of U.S. Provisional Application Ser. No. 60/804,893, entitled "Methods and Apparatus to Meter Content Consumption Using Closed Caption and Program Guide Information," filed on Jun. 15, 2006, which is hereby incorporated by reference in its entirety.

FIELD OF THE DISCLOSURE

This disclosure relates generally to the metering of content exposure and, more particularly, to methods and apparatus to meter content exposure using closed caption information.

BACKGROUND

Exposure to media content may be metered by collecting, identifying and/or extracting audience measurement codes embedded within content being presented. Such audience measurement codes are commonly inserted, embedded and/or otherwise placed into content by content providers, such as television and/or radio broadcasters, to facilitate identification of content. Alternatively or additionally, exposure to content may be measured by collecting signatures representative of the content. By comparing one or more audience measurement codes and/or signatures collected during content presentation with a database of known audience measurement codes and/or signatures, the exposure of particular pieces of content to one or more persons, respondents and/or households may be measured.

DETAILED DESCRIPTION

Figure 1:
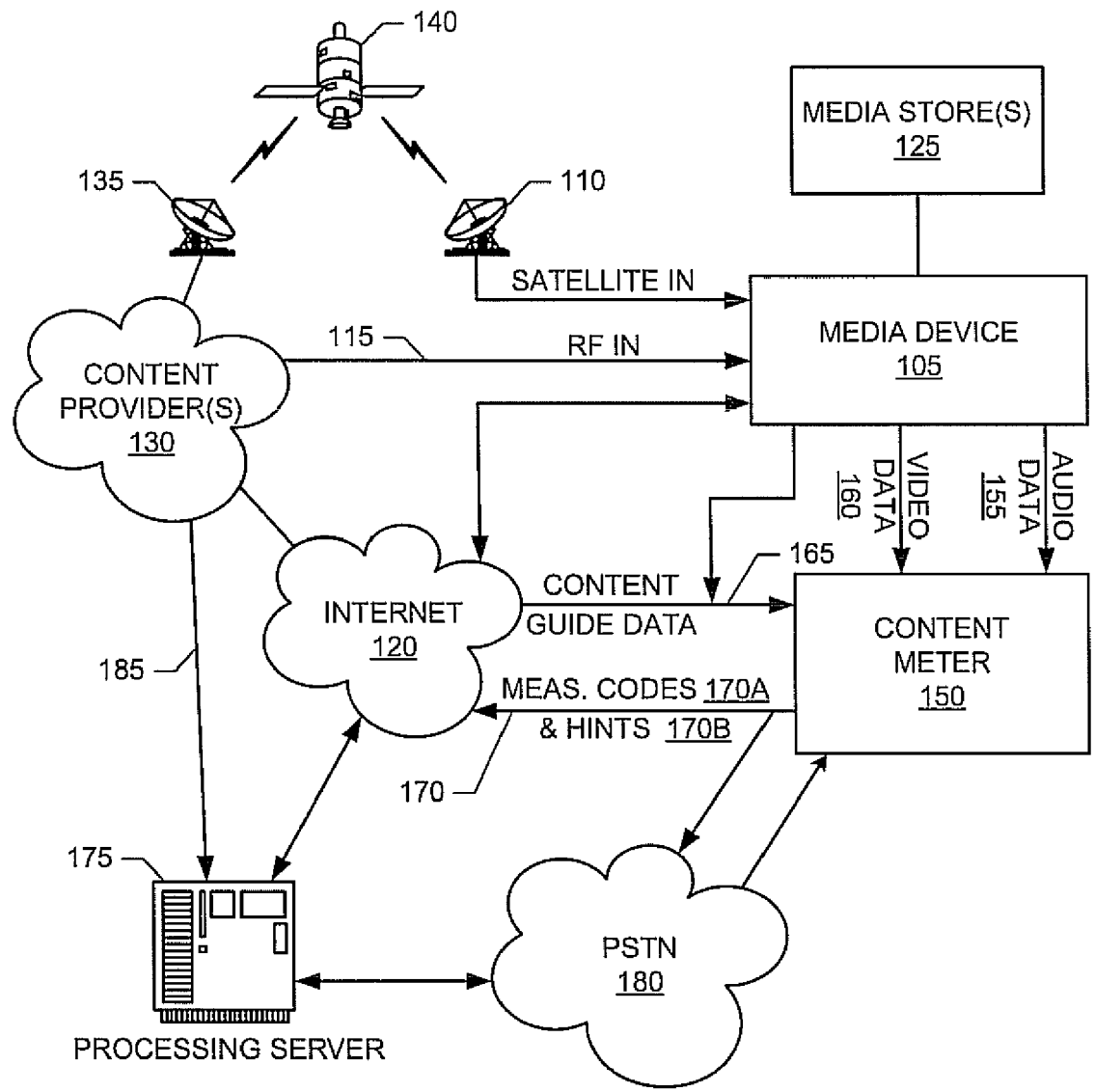
FIG. 1 is a schematic illustration of an example system to meter content exposure using closed caption information.

FIG. 1 illustrates an example system constructed in accordance with the teachings of the invention to meter content exposure using closed caption information. The example system of FIG. 1 meters a) content being presented and/or consumed at the time that the content is broadcast and/or b) content not being presented and/or consumed at the time that the content is broadcast (e.g., the system meters content being presented and/or consumed that was earlier recorded at the time of broadcast and is now being presented at a later time (i.e., time shifted viewing)). To meter content exposure, the example system of FIG. 1 uses closed caption information and/or content identifiers. As used herein, a "content identifier" is any type of data and/or information associated with, embedded with, inferable from and/or injected into a piece of content, and which may be used to identify that piece of content. Audience measurement codes (e.g., audio codes, audio watermarks, video watermarks, vertical blanking interval (VBI) codes, image watermarks and/or any other watermarks embedded in content by content providers such as television and/or radio broadcasters to facilitate identification of content), public or private identifiers in bit streams, closed captioning information, metadata, signatures, or any other type(s) of data can serve as content identifiers. A content identifier is generally not noticeable to the audience during playback, but this is not necessarily so. For content currently being broadcast, the example system of FIG. 1 utilizes audience measurement codes and/or signatures (e.g., audio, video, image and/or otherwise) to identify the content being presented and/or consumed. In particular, the collected audience measurement codes and/or signatures may be compared with a database of audience measurement codes and/or signatures that represents known content to facilitate identification of the content being presented. Likewise, for previously recorded content, the example system may also utilize audience measurement codes and/or signatures to identify the presented media content.

Since audience measurement codes and/or signatures determined from previously recorded content may be substantially time-shifted with respect to a reference database of audience measurement codes and/or signatures, the matching of audience measurement codes and/or signatures with the database to determine what content is being presented and/or consumed may become difficult and/or time consuming. As such, the example system of FIG. 1 utilizes closed caption information to identify, at the time that content is presented and/or consumed, the most likely content being presented. This likely content information is then used, as described below, during matching of audience measurement codes and/or signatures determined from the previously recorded content with the database of audience measurement codes and/or signatures. In particular, the likely content information can enable comparison of extracted and/or determined audience measurement codes and/or signatures with a smaller subset of the audience measurement code database. Closed caption information and/or likely presented and/or consumed content information may also be utilized for metering currently broadcasting content.

To receive, play, view, record, and/or decode any type(s) of content, the example system of FIG. 1 includes any type of media device 105 such as, for example, a set top box (STB), a digital video recorder (DVR), a video cassette recorder (VCR), a personal computer (PC), a game console, a television, a media player, etc. Example content includes television (TV) programs, movies, videos, commercials, advertisements, audio, video, games, etc. In the example system of FIG. 1, the example media device 105 receives content via any type(s) of sources such as, for example: a satellite receiver and/or antenna 110; a radio frequency (RF) input signal 115 received via any type(s) of cable TV signal(s) and/or terrestrial broadcast(s); any type of data communication network such as the Internet 120; any type(s) of data and/or media store(s) 125 such as, for example, a hard disk drive (HDD), a VCR cassette, a digital versatile disc (DVD), a compact disc (CD), a flash memory device, etc. In the example system of FIG. 1, the content (regardless of its source) may include closed caption information and/or data. Alternatively or additionally, the closed caption information and/or data may be provided and/or received separately from the content itself. Such separately received closed caption information and/or data may be synchronized to the content by the media device 105 and/or a content exposure meter 150.

To provide and/or broadcast content, the example system of FIG. 1 includes any type(s) and/or number of content provider(s) 130 such as, for example, television stations, satellite broadcasters, movie studios, etc. In the illustrated example of FIG. 1, the content provider(s) 130 deliver and/or otherwise provide the content to the example media device 105 via a satellite broadcast using a satellite transmitter 135 and a satellite and/or satellite relay 140, a terrestrial broadcast, a cable TV broadcast, the Internet 120, and/or media store(s) 125.

To meter exposure to and/or consumption of content, the example system of FIG. 1 includes the content exposure meter 150. The example content exposure meter 150 of FIG. 1 receives audio data 155 and/or video data 160 from the example media device 105. The example content exposure meter 150 also receives any type(s) of content guide information and/or data 165. The content guide data 165 may be broadcast and/or delivered to, or downloaded and/or otherwise received by, the content exposure meter 150 via the Internet 120, the satellite input, the RF input 115, the media device 105 and/or the media store(s) 125. In some examples, content guide data 165 is an eXtensible Markup Language (XML) file containing, for example, TV programming information (e.g., a TV guide listing) for any number of days and/or customized for the geographical location (e.g., zip or postal code) of the content exposure meter 150. The example content exposure meter 150 of FIG. 1 may be, for example: (a) a PC, (b) may be implemented by, within and/or otherwise be associated with the example media device 105, and/or (c) be an XML data collection server as described in PCT Patent Application Serial No. PCT/US2004/000818 which is hereby incorporated by reference in its entirety. An example manner of implementing the example content exposure meter 150 is discussed below in connection with FIG. 2. An example process that may be carried out to implement the example content exposure meter 150 is discussed below in connection with FIG. 6.

As described below in connection with FIGS. 2, 3 and 6, the example content exposure meter 150 of FIG. 1 uses the content guide data 165 and/or data derived from the content guide data 165, and closed caption information obtained from, for example, the video data 160 to identify, for example, one or more TV programs and/or movies that are likely being presented (e.g., viewed) at and/or via the media device 105. As described below, to enable metering of content exposure, the example content exposure meter 150 of FIG. 1 collects and/or generates audience measurement codes and/or signatures that may be used to identify content being presented. In cases when content is presented and/or consumed out of synchronization with the time of content broadcast (e.g., the content being presented and/or consumed was earlier recorded at the time of broadcast and is currently being played back at and/or via the media device 105), the example content exposure meter 150 utilizes closed caption information and content guide information (e.g., electronic program guide (EPG) information) to identify which content, out of a set of potential content candidates, represents the content that was most probably presented to the panelist/user/household member. The example content exposure meter 150 may also use closed caption information to identify which currently broadcasting content is being presented and/or consumed. When content is stored and/or recorded, for example, at and/or via the media device 105, any included and/or associated closed caption information and/or data is also stored. For example, if received content contains embedded closed caption information, the closed caption information is saved by virtue of the content being recorded.

When performing content metering, the example content exposure meter 150 of FIG. 1 divides the time during which content presentation occurs in to a set of presentation time intervals (e.g., 30 seconds) and determines for each time interval the content most likely presented and/or consumed. The time intervals may be of any duration depending on the desired granularity of the metering to be performed. Additionally, the duration of the time intervals may be fixed or may vary.

For each presentation time interval, the example content exposure meter 150 of FIG. 1 provides to a processing server 175 an ordered list of content candidates that represent the pieces of content that are and/or were most probably presented. The processing server 175 may be geographically separate from the content exposure meter 150 and/or may be co-located with the example content exposure meter 150. In the example of FIG. 1, the ordered list of content candidates is provided to the processing server 175 as a list of content exposure hints 170A. In the example of FIG. 1, the hints 170A are ordered based upon the probability that the content candidate associated with each given hint is the content being presented and/or consumed during the time interval of interest and may include, for example, the three or four most probable items. The processing server 175 may receive and process content exposure hints 170A from any number of content exposure meters 150 that may be geographically disbursed. As described below in connection with FIG. 2, the example content exposure meter 150 also collects any type(s) of audience measurement codes and/or signatures (collectively audience measurement data) 170B) from the audio data 155. The audience measurement data 170B is provided together with the content exposure hints 170A to the processing server 175. An example table used by the content exposure meter 150 to provide the hints 170A and audience measurement data 170B to the processing server 175 is discussed below in connection with FIG. 4. Additionally or alternatively, the hints 170A and audience measurement data 170B may be formatted as an XML file. The audio measurement data 170B may include and/or represent video codes, video signatures, image codes, image signatures, etc. For simplicity of discussion, the following disclosure references the use of any type of codes and/or signatures as audience measurement data 170B.

To facilitate the creation of hints 170A to identify content that is presented and/or consumed out of synchronization with the time of content broadcast (e.g., previously recorded content), the example content exposure meter 150 stores and/or otherwise retains content guide data 165 (e.g., EPG data) and/or data derived from the content guide data 165 collected during previous time periods (e.g., in the last 14 days). In this way, as described below, the content exposure meter 150 can use currently collected and/or previously collected content guide data 165 and/or data derived from the currently collected and/or previously collected content guide data 165 to identify content presented (e.g., displayed, viewed and/or listened to) at and/or via the media device 105. In the illustrated example, the time period over which the content guide data 165 and/or data derived from the content guide data 165 is retained by the example content exposure meter 150 is the time period for which the example processing server 175 is programmed to compute and/or tabulate statistics regarding content exposure.

In the illustrated example of FIG. 1, the hints 170A and audience measurement data (e.g., codes and/or signatures) 170B are provided from the content exposure meter 150 to the processing server 175 on an occasional, periodic, or real time basis. Any type(s) of technique(s) for downloading and/or transferring data from the example content exposure meter 150 to the example processing server 175 can be used. For example, the hints 170A and audience measurement data 170B can be transferred via the Internet 120, a public-switched telephone network (PSTN) 180, and/or a dedicated network. Additionally or alternatively, the example content exposure meter 150 may periodically or aperiodically store the hints 170A and audience measurement data 170B on any type(s) of non-volatile storage medium (e.g., recordable compact disc (CD-R)) that can be transported (e.g., picked up, mailed, etc.) to a processing service and then loaded onto the example processing server 175.

The example processing server 175 of FIG. 1 utilizes the hints 170A and audience measurement data 170B received from the example content exposure meter 150 to determine which content was presented and/or consumed at and/or via the example media device 105 to form content exposure data for the media device 105 and/or for a collection of one or more media devices 105. For example, the processing server 175 utilizes the hints 170A to more efficiently compare the audience measurement data (e.g., codes and/or signatures) 170B collected by the content exposure meter 150 with the database of audience measurement data (e.g., codes and/or signatures) stored and/or otherwise available at the processing server 175. As discussed previously, the database of audience measurement data at the example processing server 175 ideally represents a large portion of the universe of content, thereby, increasing the likelihood of the accurate identification of any content presented and/or consumed at the example media device 105. However, the larger the size of the database, the greater the processing power required to perform a search of all the audience measurement data stored in the database to identify a match. The example processing server 175 of FIG. 1 may, for example, receive audience measurement data from the content provider(s) 130 and/or determine the audience measurement data for content 185 received at and/or by the processing server 175. Additionally, the content represented by the audience measurement data stored in the database may include content that has been broadcast and/or that will be broadcast, and/or content that has not yet been broadcast but that is otherwise available to the user via DVD, VCR, or other storage medium. Using the hints 170A, the example processing server 175 can limit the amount of audience measurement data that must be compared and, thus, process content exposure metering information 170B from a substantially larger number of content exposure meters 150. An example processing server 175 is discussed below in connection with FIG. 5. An example process that may be carried out to implement the example processing server 175 is discussed below in connection with FIG. 7.

The example processing server 175 of FIG. 1 combines the determined content exposure data for a plurality of metered media devices 105 associated with a plurality of respondents to develop meaningful content exposure statistics. For instance, the processing server 175 of the illustrated example uses the combined content exposure data to determine the overall effectiveness, reach and/or audience demographics of viewed content by processing the collected data using any type(s) of statistical method(s).

Figure 2:
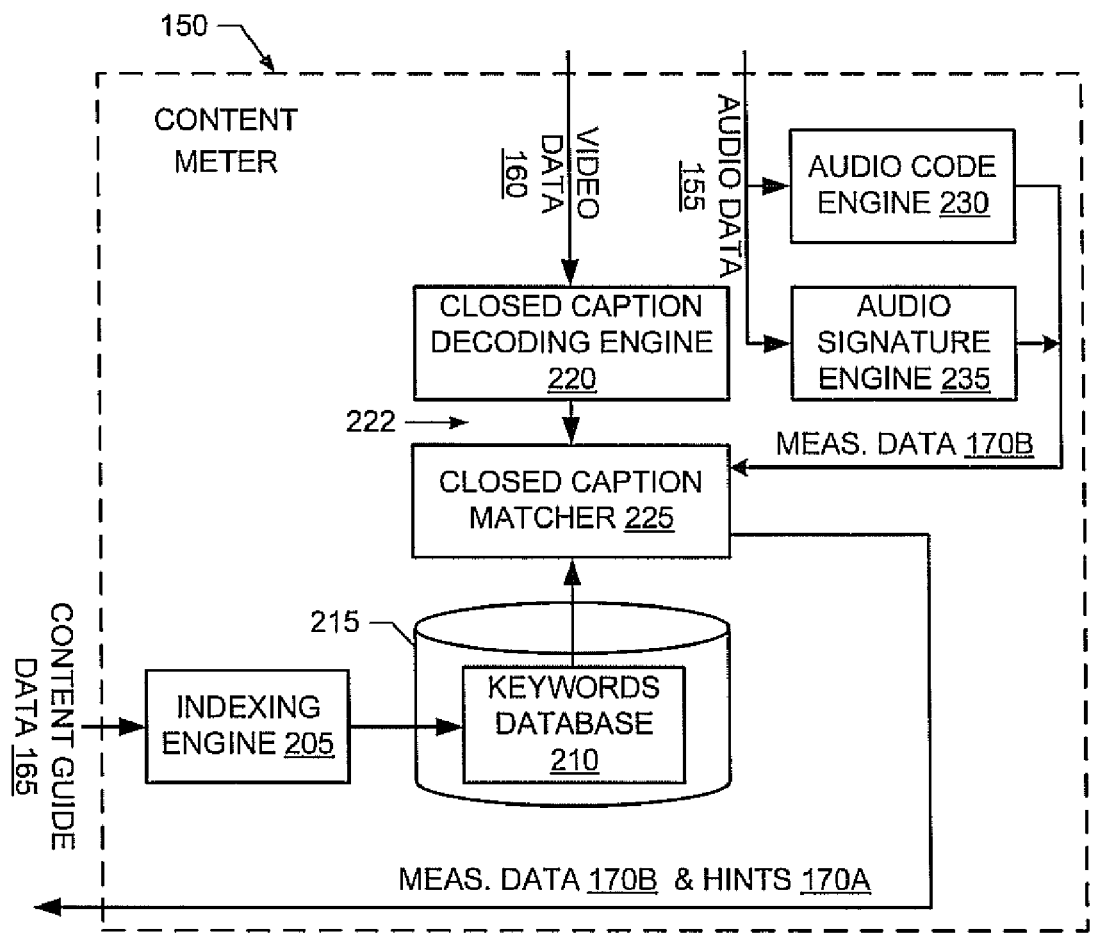
FIG. 2 illustrates an example manner of implementing the example content exposure meter of FIG. 1.

FIG. 2 illustrates an example manner of implementing the example content exposure meter 150 of FIG. 1. To process the content guide data 165, the example content exposure meter 150 of FIG. 2 includes any type of indexing engine 205. An example indexing engine 205 implements any method(s), algorithm(s) and/or technique(s) to process an XML file containing a plurality of records. Processing the XML file causes the creation of an index that identifies keyword(s) that distinguish the plurality of records represented by the XML file. Consider an example XML file that contains a TV guide listing in which each record in the XML file represents a separate TV program. Each record in the XML file contains data about the TV program such as, for example, the channel number on which the TV program is broadcast, the name associated with the channel on which the TV program is broadcast, the program name of the TV program, a description of the content of the TV program, and the time at which the TV program is to be broadcast. The example indexing engine 205 indexes the XML data to remove as much redundant information as possible while retaining keywords useful for distinguishing the listed TV programs. For example, consider a 6-6:01 PM time slot having multiple TV programs with names and/or description that include "news." Because the term "news" is "locally common" (e.g., appears in a second program in the relevant time period), the example indexing engine 205 of FIG. 2 does not include "news" in the indexed list of keywords. However, if one of those same TV programs includes in its program information a less locally commonly used term (e.g., the name of a special guest and/or a description of a special segment), the example indexing engine 205 would include the less locally commonly term (e.g., the name of the special guest and/or one or more words from the description) in the indexed list of keywords.

To store the indexed keywords that may be developed by the indexing engine 205 or any other keyword server, the example content exposure meter 150 of FIG. 2 includes a keyword database 210. The keywords stored in the keyword database 210 are indexed to an associated channel number, channel name, program name, program information (e.g., description) and/or broadcast time information. The example keyword database 210 may use any type(s) and/or number of data structure(s) (e.g., matrices, array(s), variable(s), register(s), data table(s), etc.) to store the indexed keywords. In the illustrated example, the keyword database 210 is stored in, for example, any type(s) of memory(-ies) and/or machine accessible file(s) 215. The example keywords database 210 of FIG. 2 includes indexed keywords for a current time period (e.g., the current week) as well as any number of previous time periods. The number and duration of time periods included in the keywords database 210 depends upon how far back in time the processing server 175 computes and/or tabulates statistics regarding content exposure. For example, the processing server 175 may be configured only to consider content from the previous fourteen (14) days. The example indexing engine 205 of FIG. 2 periodically or aperiodically deletes and/or otherwise removes old keywords.

To extract and/or decode closed caption data and/or information from the video data 160, the example content exposure meter 150 of FIG. 2 includes any type of closed caption decoding engine 220. Using any type(s) of method(s), algorithm(s), circuit(s), device(s) and/or technique(s), the example closed caption decoding engine 220 of FIG. 2 decodes, for example, Line 21 of National Television System Committee (NTSC) television signals or Line 22 of Phase Alternation Line (PAL) television signals to extract closed caption text 222. In the example system of FIGS. 1 and 2, the example closed caption decoding engine 220 decodes the closed caption text 222 in real time with the review, display, viewing and/or playback of content at and/or via the media device 105. Additionally or alternatively, the video data 160 could be stored at the content exposure meter 150 and processed by the closed caption decoding engine 220 in non-real time. The example closed caption decoding engine 220 of FIG. 2 also extracts and/or decodes the time information that is associated with the closed caption data and/or information (i.e., closed caption timestamps) and that is embedded together with the closed caption data and/or information in the video data 160.

To determine the content most likely being presented and/or consumed at and/or via a media device, the example content exposure meter 150 of FIG. 2 includes a closed caption matcher 225. Using any type(s) of method(s), algorithm(s), circuit(s), device(s) and/or technique(s), the example closed caption matcher 225 of FIG. 2 compares the stream of closed caption text 222 with the indexed keywords in the keywords database 210. When a match is determined, the content corresponding to the match is recorded. Over a pre-determined time interval (e.g., 5 minutes), the example closed caption matcher 225 counts the total number of matches identified and the number of matches made for each specific content (e.g., TV program). In the example of FIG. 2, at the end of each time interval, the probability that a given content candidate is actually being presented and/or consumed is the number of matches for each content candidate divided by the total number of matches. The content candidate (e.g., TV program) having the highest probability is the most likely content currently being presented and/or consumed. In the example of FIGS. 1 and 2, the four pieces of content having the highest probability (i.e., most probably content being presented and/or consumed) are provided to the processing server 175 as hints 170A for the current time interval. However, any number of hints 170A could be provided to the processing server 175.

Figure 3:
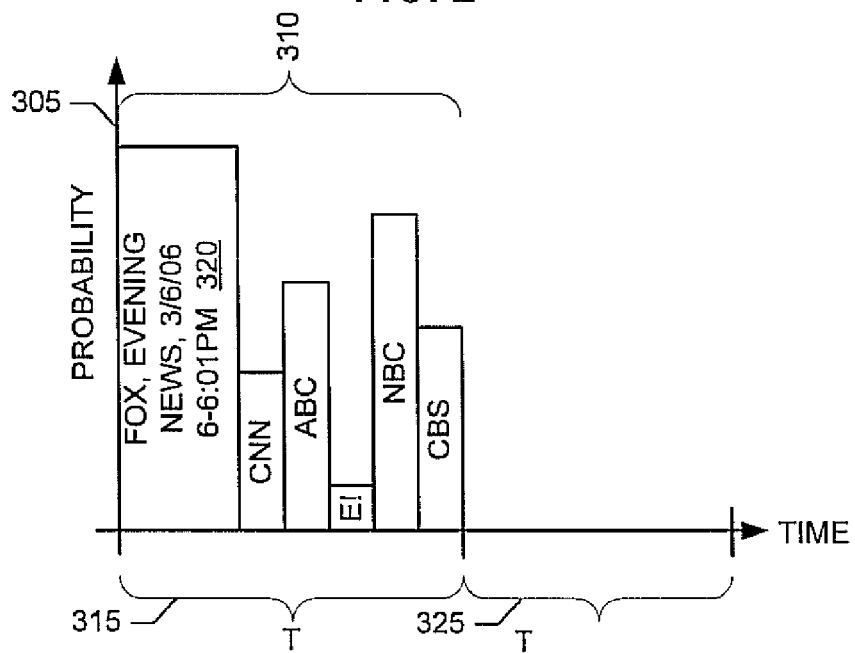
FIG. 3 is an example histogram of most probable TV channels presented and/or consumed during a given period of time.

FIG. 3 illustrates an example histogram that represents the probability 305 (i.e., likelihood) that each of a plurality of TV programs 310 was presented and/or consumed (e.g., viewed) during each time interval 315 having a time duration of T minutes. As illustrated, each of the TV programs 310 is illustrated with a bar having a height that represents the likelihood that the TV program was being viewed during the interval 315. In the example of FIG. 3, the most likely watched channel during the interval 315 was the evening news on the "FOX" TV channel during the 6:00-6:01 PM time period on Mar. 3, 2006, as indicated with bar 320. In the illustrated examples of FIGS. 1-3, the time period is determined based on the closed caption timestamp and, thus, has a granularity that is finer than the program start time, end time and/or program duration. The granularity depends upon the granularity of the closed caption time stamps and the length of the interval 315. At the end of the interval 315, the "FOX", "NBC", "ABC" and "CBS" are provided as hints to the processing server 175. As the media device 105 continues to provide video data 160, the closed caption matcher 225 of FIG. 2 continues identifying and counting matches and, then at the end of each interval 325, determines the probabilities for that interval 325, and identifies to the processing server 175 the most likely four content candidates as hints 170A associated with the time interval 325 currently being processed.

Additionally or alternatively, if a sufficient set of keywords is not available, the example closed caption matcher 225 of FIG. 2 may not be able to identify the content being presented and/or consumed with certainty. For example, the example closed caption matcher 225 may only be able to identify that the TV station being watched is ABC but not distinguish which TV program is being presented and/or consumed. Likewise, the closed caption matcher 225 may be able to identify that the evening news is being presented and/or consumed, but not which TV channel. Alternatively, no hints 170A may be available for a given time interval.

To collect audio codes for the audio data 155, the example content exposure meter 150 of FIG. 2 includes any type of audio code engine 230. Using any type(s) of method(s), algorithm(s), circuit(s), device(s) and/or technique(s), the example audio code engine 230 searches, locates, extracts and/or decodes audio codes inserted into the audio data 155 by content providers, such as television and/or radio broadcasters, to facilitate identification of content. Such audio codes are commonly used in the industry for the purposes of detecting the exposure to content. However, persons of ordinary skill in the art will readily appreciate that not all content has inserted audio codes and/or signatures.

To collect and/or generate audio signatures for the audio data 155, the example content exposure meter 150 of FIG. 2 includes any type of audio signature engine 235. Using any type(s) of method(s), algorithm(s), circuit(s), device(s) and/or technique(s), the example audio signature engine 235 of FIG. 2 processes the audio data 155 to determine binary fingerprints and/or signatures that substantially and/or uniquely identify corresponding portions of the audio data 155. An example audio signature is computed by applying data compression to the audio data 155.

In the illustrated examples of FIGS. 1 and 2, the example closed caption matcher 225 provides the audience measurement data (e.g., audio codes and/or signatures and/or signatures) 170B together with the hints information 170A to the processing server 175.

While an example content exposure meter 150 has been illustrated in FIG. 2, the elements, modules, logic, memory and/or devices illustrated in FIG. 2 may be combined, rearranged, eliminated and/or implemented in any way. For example, the example closed caption matcher 225, the example indexing engine 205, and/or the example keyword database 210 could be implemented separately from the example content exposure meter 150 (e.g., by and/or within the example processing server 175). In such examples, the content exposure meter 150 provides the closed caption information 222 and the audience measurement data 170B to the processing server 175, which generates the hints information 170A at the processing server 175. As described more fully below in connection with FIG. 5, the processing server 175 uses the generated hints information 170A and the audience measurement data 170B to identify content presented and/or consumed at and/or via a media device 105 being metered by the content exposure meter 150. Further, the example indexing engine 205, the example keywords database 210, the example memory and/or file 215, the example closed caption matcher 225, the example closed caption decoding engine 220, the example audio code engine 230, the example audio signature engine 235 and/or, more generally, the example content exposure meter 150 may be implemented by hardware, software, firmware and/or any combination of hardware, software and/or firmware. For example, the example indexing engine 205, the example keywords database 210, the example memory and/or file 215, the example closed caption matcher 225, the example closed caption decoding engine 220, the example audio code engine 230 and/or the example audio signature engine 235 may be implemented via machine accessible instructions executed by any type of processor 150 such as, for example, a processor from the Intel®, Sun®, AMD® families of processors and/or microcontrollers. Moreover, a content exposure meter may include additional elements, modules, logic, memory and/or devices and/or may include more than one of any of the illustrated elements, modules and/or devices such as, for example, a video code engine or a video signature engine.

Figure 4:
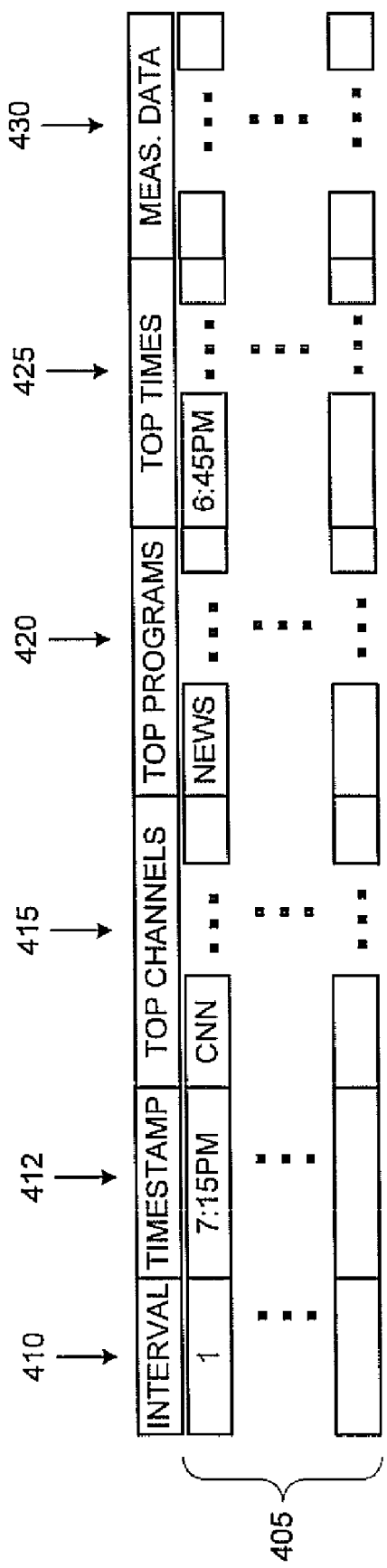
FIG. 4 is an example table of audience measurement codes and hints data.

FIG. 4 is an example hints and tuning information table having a plurality of entries 405 that each correspond to one of the hints 170A provided by the content exposure meter 150. In the example of FIG. 4, each of the plurality of entries 405 contains a time period interval identifier 410, a content timestamp 412 that indicates when the content was presented and/or consumed, and hints information that includes one or more of: (a) a listing of the highest probability content sources (e.g., TV channels) 415, (b) a listing of the highest probability pieces of content (e.g., TV programs) 420, (c) a listing of the highest probability broadcast times 425. According to the example of FIG. 4, each of the plurality of entries 405 also contains any audience measurement data 430 (e.g., audio codes and/or audio signatures) located, extracted, decoded, identified and/or computed during the time period. The extent to which a particular timestamp entry 412 and a particular broadcast time 425 match is indicative of whether the corresponding content was presented and/or consumed live and/or was previously recorded and/or captured. While an example hints and tuning information table is illustrated in FIG. 4, persons of ordinary skill in the art will readily appreciate that any type(s) of file(s), data structure(s), table(s), etc may be used by the content exposure meter 150 to format the data prior to sending the data to the processing server 175. Also, more or fewer types of information may be included in the table.

Figure 5:
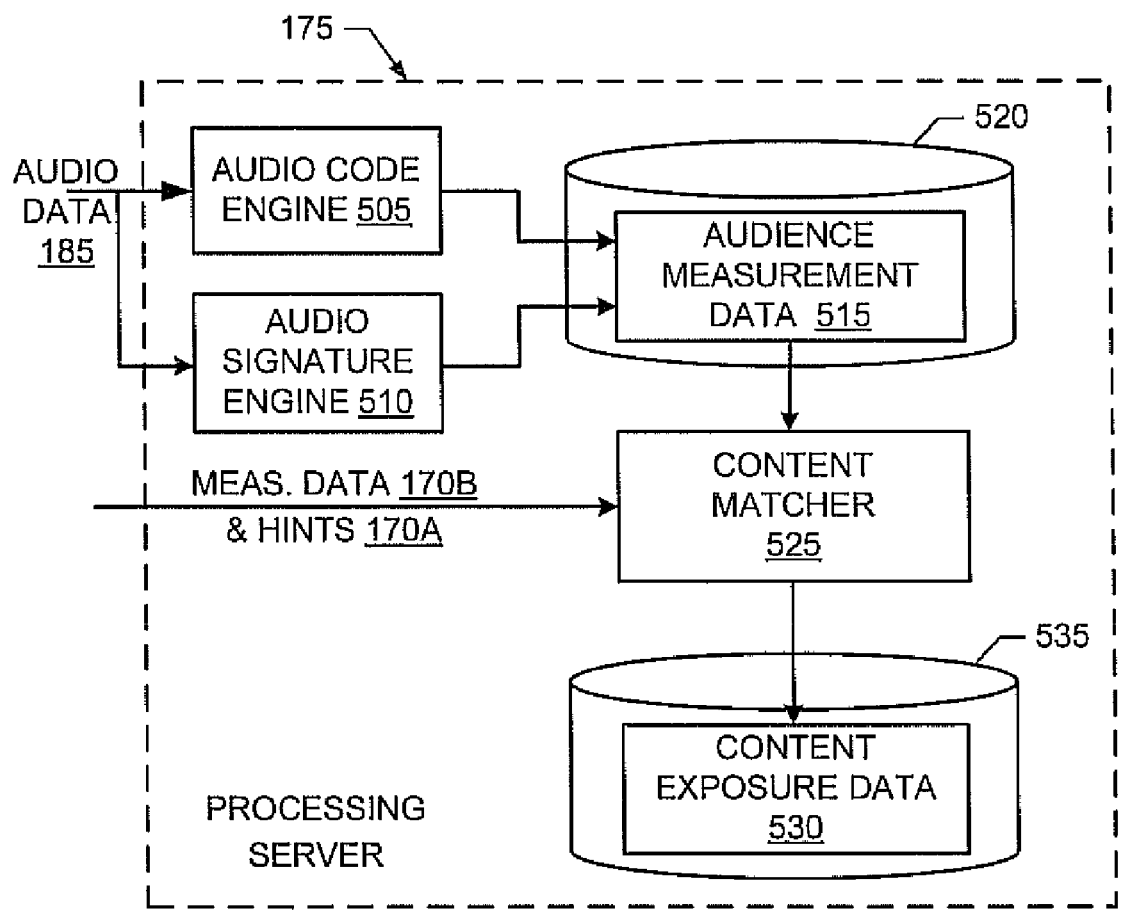
FIG. 5 illustrates an example manner of implementing the example processing server of FIG. 1.

FIG. 5 illustrates an example manner of implementing at least a portion of the example processing server 175 of FIG. 1. To determine audio codes and/or signatures for audio data 185 provided by and/or obtained from the content provider(s) 130, the example processing server 175 of FIG. 5 includes any type of audio code engine 505. Using any type(s) of method(s), algorithm(s), circuit(s), device(s) and/or technique(s), the example audio code engine 505 searches, locates, extracts and/or decodes and/or signatures audio codes and/or signatures inserted into the audio data 185 by content providers, such as television and/or radio broadcasters, to facilitate identification of content. Such audio codes are commonly used in the industry for the purposes of detecting the exposure to content. However, persons of ordinary skill in the art will readily appreciate that not all content contains audio codes. Additionally or alternatively, the content provider(s) 130 may only provide audio codes for content for which exposure and/or consumption statistics are desired.

To determine audio signatures for the audio data 185, the example processing server 175 of FIG. 5 includes any type of audio signature engine 510. Using any type(s) of method(s), algorithm(s), circuit(s), device(s) and/or technique(s), the example audio signature engine 510 of FIG. 5 processes the audio data 185 to determine binary fingerprints and/or signatures that substantially and/or uniquely identify corresponding portions of the audio data 185. An example audio signature is computed by applying data compression to the audio data 185.

In the example of FIG. 5, audience measurement data 515 (e.g., audio codes and/or audio signatures) located, decoded, extracted, identified and/or computed by the example audio code engine 505 and/or the example audio signature engine 510 and/or received from the content provider(s) 130 are stored using any type(s) and/or number of database(s) and/or data structure(s) (e.g., matrices, array(s), variable(s), register(s), data table(s), etc.) and are stored in, for example, any type(s) of memory(-ies) and/or machine accessible file(s) 520. The example audience measurement database 515 of FIG. 5 is indexed by associated channel number, channel name, program name, program information (e.g., description) and/or broadcast time information. The example audience measurement database 515 includes audio codes and/or signatures corresponding to content that is currently being broadcast, to content that was broadcast, and/or content that will be broadcast in the future. The amount of data in the database 515 may be selected based on the desired time period over which the example processing server 175 is programmed to compute and/or tabulate statistics regarding content exposure and/or consumption. For example, the example processing server 175 of FIG. 5 may be configured to only consider content that is and/or was broadcast and/or was otherwise available during the previous fourteen (14) days. However, if mounting of stored media is desired (e.g., DVDs), then the database 515 should not be limited based on time.

To identify content presented and/or consumed at and/or via a media device 105, the example processing server 175 of FIG. 5 includes a content matcher 525. The example content matcher 525 of FIG. 5 utilizes the hints 170A and audience measurement data 170B received from a content exposure meter 150 to determine which content was presented and/or consumed at and/or via the example media device 105 to form content exposure data 530 for the media device 105. In particular, the example content matcher 525 utilizes the provided hints 170A to identify a subset of the codes and/or signatures stored in the audience measurement database 515 of the processing server 175 to compare with the audience measurement data 170B collected from the example media device 105. A match between the audience measurement data 170B and a particular audio code and/or signature 515 indicates that the content corresponding to the particular audio code/signature stored in the processing server 175 is the content that was presented and/or consumed at and/or via the media device 105.

Using the hints 170A, the content matcher 525 can substantially reduce the number of audience measurement data from the database 515 that must be compared with the audience measurement data 170B collected by the content exposure meter 150. As a result, the content measurement data 170B can be processed for a substantially larger number of content exposure meters 150. An example process that may be carried out to implement the example content matcher 525 of FIG. 5 is discussed below in connection with FIG. 7.

In the example of FIG. 5, content exposure data 530 is stored using any type(s) and/or number of data structure(s) (e.g., matrices, array(s), variable(s), register(s), data table(s), etc.) and is stored in, for example, any type(s) of memory(-ies) and/or machine accessible file(s) 535. The content exposure data 530 may include content exposure data for a plurality of other metered media devices 105 associated with a plurality of respondents to develop meaningful content exposure statistics. The combined content exposure data 530 may be statistically processed to determine, for example, the overall effectiveness, reach and/or audience demographics of presented and/or consumed content.

While an example processing server 175 has been illustrated in FIG. 5, the elements, modules, logic, memory and/or devices illustrated in FIG. 5 may be combined, re-arranged, eliminated and/or implemented in any way. For example, the example closed caption matcher 225, the example indexing engine 205, and/or the example keyword database 210 of FIG. 2 could be implemented by and/or within the processing server 175. In such examples, the content exposure meter 150 provides the closed caption information 222 and the audience measurement data 170B to the processing server 175. Based on the received closed caption information 222, the processing server 175 generates the hints information 170A at the processing server 175. In some examples, the processing server 175 receives closed caption information 222 from some content exposure meters 150 and receives hints information 170A from other content exposure meters 150. Further, the example audio code engine 505, the example audio signature engine 510, the memory 520, the example content matcher 525, the example memory 535 and/or, more generally, the example processing server 175 may be implemented by hardware, software, firmware and/or any combination of hardware, software and/or firmware. For example, the example audio code engine 505, the example audio signature engine 510, the memory 520, the example content matcher 525, the example memory 535 may be implemented via machine accessible instructions executed by any type of processor 175 such as, for example, a processor from the Intel®, Sun®, or AMD® families of processors and/or microcontrollers. Moreover, a content exposure meter may include additional elements, modules, logic, memory and/or devices and/or may include more than one of any of the illustrated elements, modules and/or devices such as, for example, a video code engine or a video signature engine.

Figure 6:
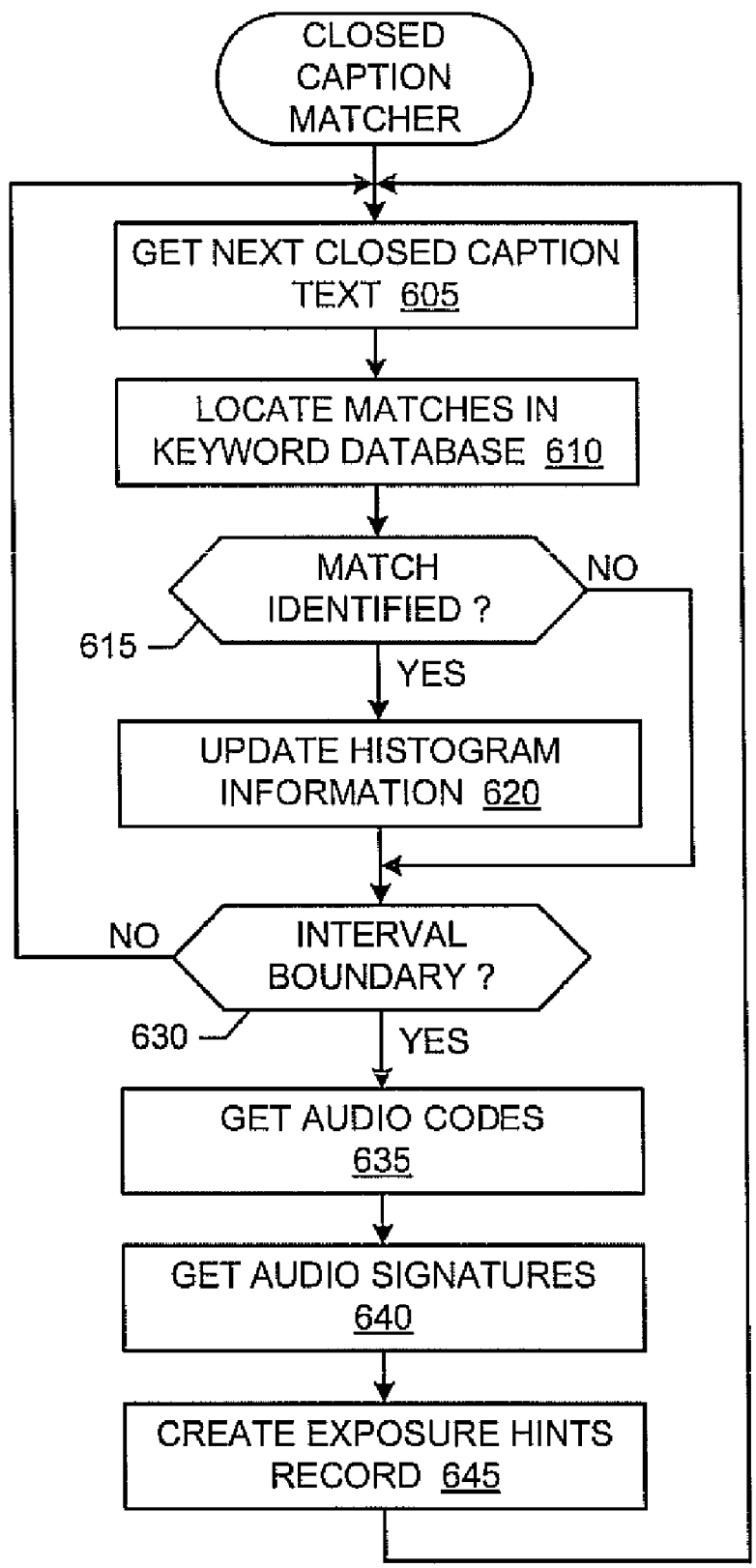
FIG. 6 is a flowchart representative of an example process that may be executed to implement the example content exposure meter of FIG. 1.
Figure 7:
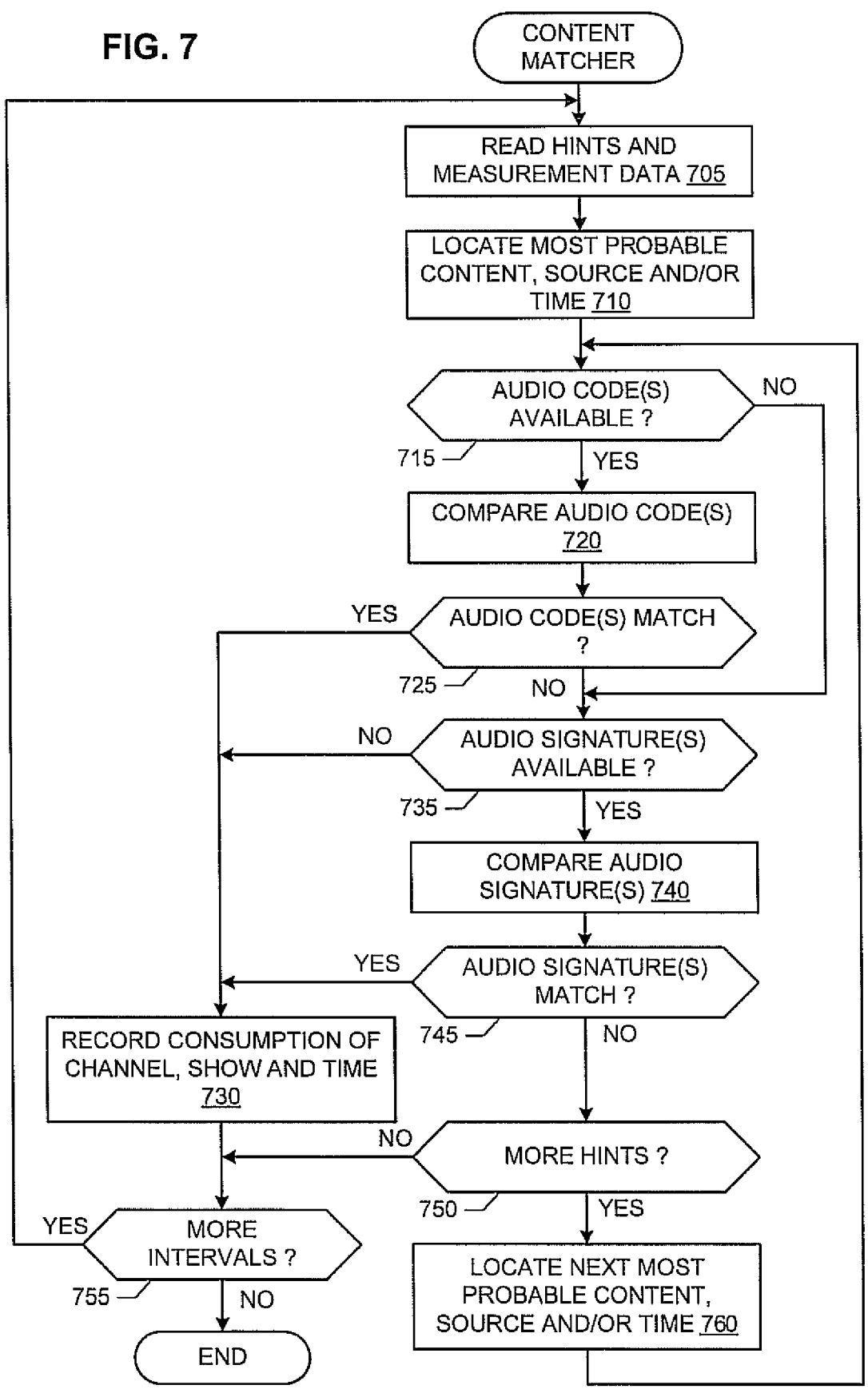
FIG. 7 is a flowchart representative of an example process that may be executed to implement the example processing server of FIG. 1.

FIGS. 6 and 7 are flowcharts representative of example processes that may be executed to implement the example content exposure meter 150 and the example processing server 175 of FIG. 1, respectively and/or, more generally, to meter content exposure using closed caption information. The example processes of FIGS. 6 and/or 7 may be executed by a processor, a controller and/or any other suitable processing device. For example, part or all of the flow diagrams of FIGS. 6 and/or 7 may be embodied in coded instructions stored on a tangible medium such as a flash memory, or RAM associated with a processor (e.g., the example central processing unit 805 discussed below in connection with FIG. 8). Alternatively, some or all of the example processes of FIGS. 6 and/or 7 may be implemented using an application specific integrated circuit (ASIC), a programmable logic device (PLD), a field programmable logic device (FPLD), discrete logic, hardware, firmware, etc. Also, some or all of the example processes of FIGS. 6 and/or 7 may be implemented manually or as combinations of any of the foregoing techniques, for example, a combination of firmware and/or software and hardware. Further, although the example processes of FIGS. 6 and 7 are described with reference to the flowcharts of FIGS. 6 and 7, persons of ordinary skill in the art will readily appreciate that many other methods of implementing the example content exposure meter 150 and/or the example processing server 175 of FIG. 1, respectively, and/or, more generally, to meter content exposure using closed caption information and program guide data may be employed. For example, the order of execution of the blocks may be changed, and/or some of the blocks described may be changed, eliminated, sub-divided, or combined. Additionally, persons of ordinary skill in the art will appreciate that the example processes of FIGS. 6 and/or 7 may be carried out sequentially and/or carried out in parallel by, for example, separate processing threads, processors, devices, circuits, etc.

The example process of FIG. 6 begins with a closed caption matcher (e.g., the example closed caption matcher 225 of FIG. 2) obtaining and/or receiving the portion of closed caption text (i.e., word and/or words) collected during the next time interval from a closed caption decoding engine 220 (block 605). The closed caption matcher 225 then compares the closed caption text against indexed keywords in a keyword database (e.g., the keyword database 210 of FIG. 2) (block 610). If a match of at least one closed caption word with at least one indexed keyword is identified (block 615), the content corresponding to the matching keyword is identified (e.g., the example content 320 of FIG. 3) and the histogram information for the identified content is updated (block 620). If a match is not identified (block 615), the updating of the histogram is skipped.

The closed caption matcher 225 then determines if the end of the time interval currently being processed (e.g., the example interval 315 of FIG. 3) has arrived (i.e., if a boundary of the time interval 315 (i.e., an interval boundary) has occurred) (block 630). If an interval boundary has not occurred (block 630), control returns to block 605 to get the next closed caption text (block 605). If an interval boundary has occurred (block 630), the closed caption matcher 225 obtains and/or receives any audio codes and/or signatures collected from the content presented and/or consumed during the just ended time interval (block 635) and obtains and/or receives the audio signatures computed for the content presented and/or consumed during the just ended time interval (block 640). The closed caption matcher 225 then creates and/or adds a hints and audience measurement data entry (e.g., an entry 405 of FIG. 4) into the table and/or sends the hints and audience measurement data to a processing server 175.

The example process of FIG. 7 begins with a content matcher (e.g., the example content matcher 525 of FIG. 5) reading the hints 170A and audience measurement data 170B for a time interval 315 (e.g., the example entry 405 of FIG. 4) (block 705). The content matcher 525 identifies the most probable content, content stream and/or broadcast time (block 710) and determines if audio codes for the most probable content, content stream and/or broadcast time are available (block 715). Additionally or alternatively, the content matcher 525 may at block 710 utilize a content timestamp (e.g., the example timestamp 412 of FIG. 4) when selecting the most probable content, content stream and/or broadcast time. For example, the content matcher 525 may first select a content candidate that is associated with the presentation of live content (e.g., being presented while the content is being broadcast). If applicable audio codes are included in the audience measurement data 170B (block 715), the content matcher 525 compares the audio codes and/or signatures with the audio codes and/or signatures 515 corresponding to the content candidate (block 720). If there is a match (block 725), the content matcher 525 credits, tallies and/or tabulates a presentation of the content candidate (i.e., identifies the content candidate as the content that was presented and/or consumed) together with the timestamp (e.g., the example timestamp 412 of FIG. 4) in the content exposure data 530 (block 730). The timestamp indicates the time of content exposure.

If at block 715 applicable audio codes and/or signatures are not available, or if at block 725 the audio codes and/or signatures do not match, the content matcher 525 determines if audio signatures for the most probable content candidate are available (block 735). If audio signatures are not available (block 735), the content matcher 525 assumes the most probable candidate content, source and/or broadcast time was presented and/or consumed and records the exposure of the candidate content together with the timestamp (e.g., the example timestamp 412 of FIG. 4) in the content exposure data 530 (block 730). The timestamp indicates the time of content exposure.

If the audio signatures are available (block 735), the content matcher 525 compares the audio signatures with the audio signatures 515 corresponding to the content candidate (block 740). If the audio signatures match (block 745), the content matcher 525 records the match (i.e., identifies the content candidate as the content that was presented and/or consumed) together with the timestamp (e.g., the example timestamp 412 of FIG. 4) in the content exposure data 530 (block 730). The timestamp indicates the time of content exposure.

If the audio signatures do not match (block 745), the content matcher 525 determines if there are more hints (block 750). If there are no more hints (block 750), control proceeds to block 755 to determine if there are additional time intervals of hints to be processed. Additionally or alternatively, the content matcher 525 compares the audience measurement data collected from the media device 105 with all of the audience measurement data 515 stored in the database to determine if a match is identified.

If there are more hints (block 750), the content matcher 525 identifies the next most probable content candidate (block 760). Control then returns to block 715.

At block 755, if more hints 170A and audience measurement data 170B for more intervals is available (block 755), control returns to block 705 to process the next time interval. If not more hints 170A and audience measurement data 170B is available (block 755), control exits from the example machine accessible instructions of FIG. 7.

Figure 8:
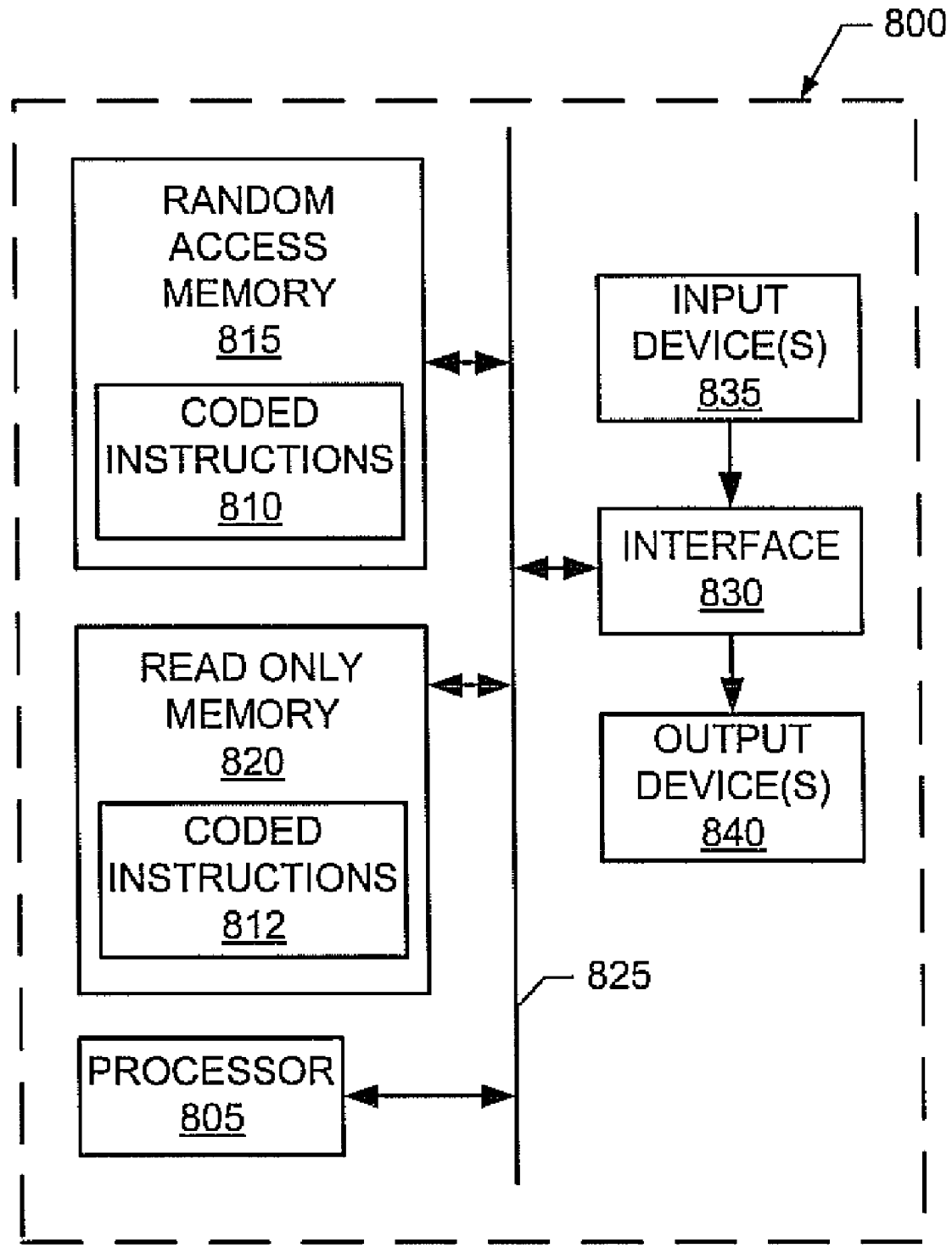
FIG. 8 is a schematic illustration of an example processor platform that may be used and/or programmed to execute the example processes of FIGS. 6 and/or 7 to implement the example content exposure meter and/or the example processing server of FIG. 1.

FIG. 8 is a schematic diagram of an example processor platform 800 that may be used and/or programmed to, for example, carry out the example processes of FIGS. 6 and/or 7 to implement the example content exposure meter 150 and the example processing server 175 of FIG. 1, respectively and/or, more generally, to meter content exposure using closed caption information and program guide data. For example, the processor platform 800 can be implemented by one or more general purpose microprocessors, microcontrollers, etc.

The processor platform 800 of the example of FIG. 8 includes a general purpose programmable and/or specialized processor 805. The processor 805 executes coded instructions 810 and/or 812 present in main memory of the processor 805 (e.g., within a random access memory (RAM) 815 and/or a read-only memory (ROM) 820). The processor 805 may be any type of processing unit, such as a processor and/or microcontroller from any of the Intel®, Sun®, and/or AMD® families of processors and/or microcontrollers. The processor 805 may carry out, among other things, the example processes illustrated in FIGS. 6 and/or 7.

The processor 805 is in communication with the main memory (including the RAM 815 and a ROM 820) via a bus 825. The RAM 815 may be implemented by DRAM, SDRAM, and/or any other type of RAM device. The ROM 820 may be implemented by flash memory and/or any other desired type of memory device. Access to the memories 815 and 820 is typically controlled by a memory controller (not shown) in a conventional manner. The RAM 815 may be used, for example, to store the example keywords database 210 of FIG. 2, and/or the example audience measurement database 515 and/or the example content exposure data 530 of FIG. 5.

The processor platform 800 also includes a conventional interface circuit 835. The interface circuit 835 may be implemented by any type of well-known interface standard, such as an external memory interface, serial port, general purpose input/output, etc.

One or more input devices 835 and one or more output devices 840 are connected to the interface circuit 835. The input devices 835 may be used, for example, to receive audio data 155, video data 160, content guide data 165, audio data 185, etc. The output devices 840 may be used, for example, to send the audience measurement data 170B and/or the hints 170A from the content exposure meter 150 to the processing server 175.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    developing a keyword database of terms based on a program guide descriptive of a plurality of programs for a given time period;
    generating a plurality of likelihood values for respective ones of the plurality of programs based on comparison of closed caption text associated with a presented program to the keyword database, the values representing likelihoods that the respective ones of the plurality of programs is the presented program, the likelihood values being generated without comparing the collected audience measurement data to any reference audience measurement data;
    collecting an audience measurement parameter for the presented program, the audience measurement parameter useable to identify the presented program;
    employing the plurality of likelihood values using a processor to select a subset of the plurality of programs to form a list of most probable presented programs, wherein the selected subset includes more than one of and less than all of the plurality of programs; and
    sending the list of most probable programs and the collected audience measurement data to a collection server, the collection server to compare the collected audience measurement data to reference audience measurement data for respective ones of the most probable programs in an order selected based on the likelihood values for respective ones of the most probable programs in the list.

2. A method as defined in claim 1, wherein generating the likelihood values comprises counting matches of the closed caption text and the keyword database for respective ones of the plurality of programs.

3. A method as defined in claim 2, further comprising:
    computing a sum of the one or more matches for a respective one of the plurality of programs; and
    dividing each of the matches by the sum.

4. A method as defined in claim 1, wherein the program guide information comprises an eXtensible Markup Language (XML) data structure.

5. A method as defined in claim 1, wherein the collected audience measurement parameter comprises at least one of an audio code embedded in the presented program, a video code embedded in the presented program, an audio signature generated from the presented program, or a video signature generated from the presented program.

6. A method as defined in claim 5, wherein the audio code is embedded in the presented program by a broadcaster to identify the presented program.

7. A method as defined in claim 1, wherein the list further includes at least one of a most probable channel or a most probable time.

8. An apparatus comprising:
    an audience measurement engine to collect an audience measurement parameter for a presented program;
    an indexing engine to create a keyword database based on data descriptive of a plurality of programs; and a closed caption matcher to:
  generate likelihood values for respective ones of the plurality of programs based on comparison of closed caption text associated with the presented program to the keyword database, the values representing likelihoods that the respective ones of the plurality of programs is the presented programs, the likelihood values being generated without comparing the collected audience measurement data to any reference audience measurement data;
  select a subset of the plurality of programs based on the likelihood values to form a list of most probable presented programs, the list of most probable presented programs including more than one of and fewer than all of the plurality of programs;
  order the list of most probable presented programs based on respective ones of the likelihood values; and
  send the ordered list of most probable programs and the collected audience measurement data to a collection server, the collection server to compare the collected audience measurement data to reference audience measurement data for respective ones of the most probable programs based on the order of the most probable programs in the list to determine an audience presentation statistic, wherein at least one of the audience measurement engine, the indexing engine or the closed caption matcher is implemented in hardware.

9. An apparatus as defined in claim 8, further comprising a closed caption decoding engine to extract the closed caption text.

10. An apparatus as defined in claim 8, wherein the audience measurement parameter comprises at least one of an audio code embedded in the presented program, a video code embedded in the presented program, an audio signature generated from the presented program, or a video signature generated from the presented program.

11. An apparatus as defined in claim 8, wherein the closed caption matcher is to generate the likelihood values by counting matches of the closed caption text and the keyword database for respective ones of the plurality of programs.

12. An apparatus as defined in claim 8, wherein the indexing engine is to generate the keyword database to remove redundant information.

13. An apparatus as defined in claim 8, wherein the list further includes at least one of a most probable channel or a most probable time.

14. A tangible article of manufacture excluding propagating signals, the article comprising a computer-readable storage medium storing machine readable instructions that, when executed, cause a machine to:
  develop a keyword database of terms based on a program guide descriptive of a plurality of programs for a given time period;
  collect audience measurement data for a presented program, the audience measurement data useable to identify the presented program;
  generate likelihood values for respective ones of the plurality of programs based on comparison of closed caption information associated with the presented program and the keyword database, the values representing likelihoods that the respective ones of the plurality of programs is the presented program, the likelihood values being generated without comparing the collected audience measurement data to any reference audience measurement data;
  select a subset of the plurality of programs based on the likelihood values to form a list of most probable presented programs, the list of most probable presented programs including more than one of and fewer than all of the plurality of programs;
  order the list of most probable presented programs based on respective ones of the generated likelihood values; and
  send the ordered list of most probable programs and the collected audience measurement data to a collection server, the collection server to compare the collected audience measurement data to reference audience measurement data for respective ones of the most probable programs based on the order of the most probable programs in the list to identify the presented program.

15. A tangible article of manufacture as defined in claim 14, wherein the machine accessible instructions, when executed, cause the machine to generate the likelihood values by counting matches of the closed caption text and the keyword database for respective ones of the plurality of programs.

16. A tangible article of manufacture as defined in claim 14, wherein the program guide information comprises an eXtensible Markup Language (XML) data structure.

17. A tangible article of manufacture as defined in claim 14, wherein the audience measurement data comprises at least one of an audio code, a video code, an audio signature, or a video signature.

18. A tangible article of manufacture as defined in claim 17, wherein the audio code is inserted by a broadcaster to identify the presented program.

19. A tangible article of manufacture as defined in claim 14, wherein the further includes at least one of a most probable channel or a most probable time.

20. A method comprising:
  receiving from a content meter an audience measurement parameter for a presented program;
  receiving from the content meter a list of most probable presented programs, programs in the list being selected and ordered based on comparisons of closed-caption text associated with the presented programs to a keyword database, the ordered list including more than one of and fewer than all of the plurality of programs; and
  comparing using a processor reference audience measurement parameters for respective ones of the most probable presented programs until the presented content is identified, the reference audience measurement parameters compared in accordance with the order of the most probable presented programs in the list.

21. A method as defined in claim 20, wherein the collected audience measurement parameter comprises at least one of an audio code embedded in the presented program, a video code embedded in the presented program, an audio signature generated from the presented program, or a video signature generated from the presented program.

22. A method as defined in claim 20, wherein the ordered list further includes at least one of a most probable channel, or a most probable time.

* * * * *